Jan. 23, 1940.  W. SCHMIDT  2,187,953
PHOTOGRAPHIC CAMERA
Filed Dec. 7, 1937
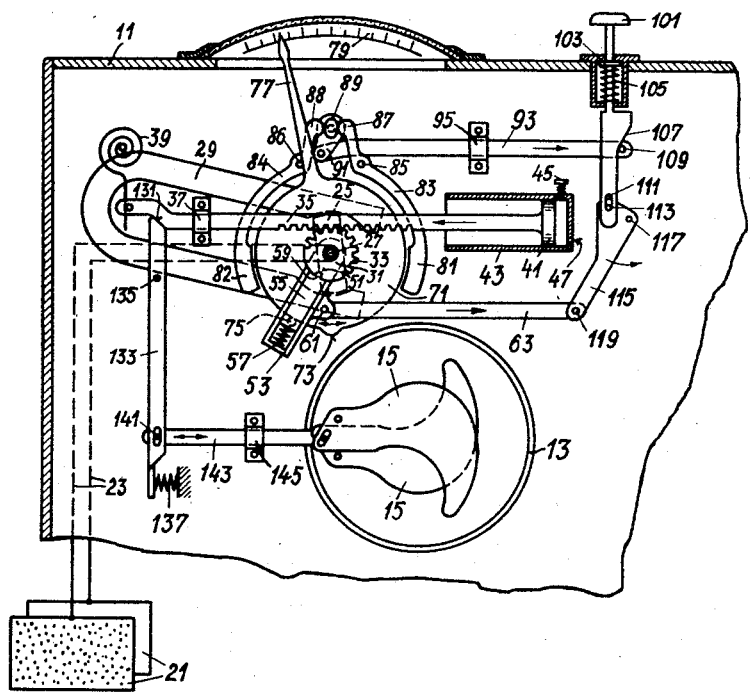
Inventor:
Walter Schmidt,
by
Cumpston & Shepard
his attorneys.

UNITED STATES PATENT OFFICE 2,187,953

PHOTOGRAPHIC CAMERA

Walter Schmidt, Berlin, Germany, assignor of one-half to Friedrich Deckel, Munich-Prince-Ludwigshohe, Bavaria, Germany Application December 7, 1937, Serial No. 178,555
In Germany December 10, 1936

10 Claims. (Cl. 95—62)

In photographic cameras there are usually one or more variable or adjustable parts which should be set to one or another of various different positions in accordance with the strength of intensity of the light available for taking the picture. Among such variable or adjustable parts are the diaphragm controlling means for making the diaphragm aperture larger or smaller, and the exposure timing or controlling means for making the exposure of longer or shorter duration.

It has heretofore been suggested that the setting of one or another of such variable parts be controlled or operated by a photocell responsive to light conditions. So far as I am aware, none of the arrangements heretofore proposed has been wholly satisfactory or practical. Usually it has been proposed to provide a member moved by or under control of the photocell, which member forms a stop or abutment for a feeler member driven by a spring or other suitable motive power until the feeler comes into contact with the member controlled by the photocell. Such prior arrangements have the grave disadvantage that, in order to withstand the force of the motive power which drives the feeler, the member controlled by the photocell must be made relatively heavy and strong, with the result that it does not have the desired high sensitivity to variations in light intensity. On the other hand, if the member controlled by the photocell is made sufficiently light and easily movable to be highly sensitive to varying conditions of light intensity, then it is not sufficiently strong to withstand the pressure of the motive power of the feeler, and is likely to become damaged thereby.

Accordingly, it is an object of the present invention to overcome the disadvantages of such prior constructions and to provide a generally improved and more satisfactory arrangement whereby one or more of the variable or adjustable members of a photographic camera or other mechanism may be positioned or controlled automatically in accordance with the available light intensity as determined by a photocell.

More specifically, another object of the invention is to provide an arrangement whereby the element directly moved or controlled by the photocell need not withstand the full pressure of power means operating a feeler or the like, and thus may be made relatively small and light, so as to have high sensitivity.

Still another object is the provision of an arrangement in which the element moved or controlled by the photocell, instead of being required to withstand the pressure of driving means for driving the adjustable member, acts simply to disengage the driving means from or engage it with the adjustable member at the proper point during the movement of the driving means, so that the driving means may move through a full range of movement but will move the adjustable member only through the proper part of its range of movement, as determined by the position of the element controlled by the photocell.

A further object is the provision of improved means for holding the photocell controlled element in stationary position while it is acting in the above mentioned manner to connect or disconnect the driving means.

To these and other ends the invention resides in certain improvements and combinations of parts, all as will be hereinafter more fully described, the novel features being pointed out in the claims at the end of the specification.

In the drawings, the figure is a front view of a camera, with the front cover removed in order to show, somewhat diagrammatically, mechanism constituting an illustrative embodiment of the present invention.

Referring now to the drawing, a fragment of the camera casing is indicated at 11. The camera is provided with suitable mechanism for making exposures or taking pictures, which mechanism includes a shutter casing 13 containing a shutter of any suitable type, having movable blades indicated diagrammatically at 15, and having a suitable lens, diaphragm, and other usual parts associated with the shutter.

At 21 there is indicated diagrammatically a photocell, preferably mounted directly on the camera casing in position to receive light emanating from or reflected by the object to be photographed, which photocell may be of any suitable known construction. It may be of the type requiring a separate battery or source of current, but preferably is of the known photovoltaic type which does not require a separate source of current and which generates its own current proportional to the intensity or strength of light falling on the cell. This photocell 21 is connected through a wiring circuit 23 to any suitable metering device responsive to variations in flow of current through the circuit 23, such as the moving coil 25 mounted to turn on a suitable pivot shaft 27 in the field of a magnet 29, and under the influence of the usual spring (not shown) which constantly tends to turn the coil in one direction to a neutral or initial position determined by a fixed stop.

The parts thus far described may all be of well known construction, and operate in the usual way, the coil being automatically set in a position dependent upon the strength of the light falling upon the photocell 21. If desired, a rheostat or other manually adjustable means may be interposed in the circuit 23 to vary the position assumed by the coil 25, to compensate for different speeds of photographic film used in the camera, or for other variable factors or conditions, other than those automatically adjusted by the mechanism of the present invention.

The variable or adjustable part or member of the picture taking mechanism which is to be set automatically in accordance with the strength of the light is, in this illustrative embodiment of the invention, formed by the member 31, rotatably mounted on the pivot shaft 27 on which the coil 25 is mounted, or on any other suitable shaft preferably substantially concentric with the axis of rotation of the coil. This rotary member 31 may form part of or be connected to whatever variable or adjustable member or members of the camera are to be set automatically in accordance with the light intensity, and the position assumed by the member 31 may control the diaphragm opening, or the shutter speed, or any other desired variable factor or factors. In the present instance, but only as an illustrative example, the member 31 controls the shutter speed in the manner further explained below.

This member 31 has gear teeth 33 extending around part of its periphery and meshing with the teeth of a rack bar 35 longitudinally movable in a guide 37 so that rotation of the member 31 moves the rack bar 35 in one direction or the other. A spring 39 normally tends to move the rack bar 35 in a rightward direction and the member 31 in a clockwise direction, to a normal or undisplaced initial position. When the member 31 and rack bar 35 are released after leftward movement of the rack bar, the resulting rightward movement of the rack bar under the influence of its spring 39 may be controlled by a suitable timing or retarding mechanism which may, for example, be of the gear train or clockwork type, or, as here shown by way of example, of the fluid cylinder type, including a piston 41 on the rack bar 35 operating within a cylinder 43. A check valve 45 near the right end of the cylinder opens inwardly as the piston moves leftwardly, to admit air to the right end of the cylinder so that the retarding mechanism offers negligible resistance to leftward movement of the parts. When the rack bar 35 moves rightwardly, the check valve 45 closes and air trapped to the right of the piston 41 can escape only at a uniform slow rate through the very small escape port 47, which so meters or controls the escape of air that the rightward movement of the rack bar 35 takes place at a predetermined timed or regulated rate.

To move the rack bar 35 leftwardly, the rotary member 31 is provided with a notch 51, and driving means is provided in the form of a hollow arm 53 having near one end a bearing on the shaft 27 or on another suitable shaft approximately coaxial therewith, so that this arm 53 may oscillate or swing back and forth around the axis 27. In this hollow arm 53 there is mounted for radial movement toward and away from the axis 27 a block 55 constantly pressed radially inwardly toward the axis 27 by suitable means such as a spring 57. The inner end of block 55 has a tooth 59 which may engage in the notch 51 of the rotary member 31 when the parts are in proper cooperative relationship to each other. The arm 53 is pivotally connected at 61 to a driving link 63 which, when drawn rightwardly in a manner hereafter described, swings the arm 53 in a counterclockwise direction around the axis 27 and causes corresponding counterclockwise rotation of the rotary member 31 so long as the tooth 59 on the arm 53 remains engaged with the notch 51 of the rotary member 31.

To control the extent of counterclockwise turning of the member 31 in accordance with the strength of the light falling upon the photocell 21, a disk-like member 71 is mounted on or otherwise suitably connected to the moving coil 25 to turn therewith. At one point on the periphery of this disk-like member is a cam projection 73 which lies in the path of a pin 75 mounted on the slidable block 55 in the arm 53. As the arm 53 moves in a counterclockwise direction from its normal rest position to its other extreme position, the pin 75 will sooner or later engage with the cam 73 on the disk 71, which cam will move the pin 75 radially outwardly away from the axis 27, thus moving the block 55 to disengage the tooth 59 from the notch 51 of the rotary member 31. When this disengagement takes place, the rotary member 31 will not be moved any farther by a swinging of the arm 53 but the arm 53 may continue to swing to the end of its full range of movement. The point at which the tooth 59 will be disengaged from the notch 51 will depend on the point at which the cam 73 is located, which in turn depends on the position assumed by the moving coil 25, and this in turn is dependent upon the strength of the light falling upon the photocell 21. Thus, when the link 63 of the driving mechanism is moved rightwardly, the rotary member 31 and the rack bar 35 are moved from their initial or rest positions through an extent of movement proportional to the strength of light falling on the photocell 21, and are set in positions corresponding to this strength of light, and the driving means is then disengaged from the member 31 so that the driving means may continue its full range of movement without disturbing the set position of the parts 31 and 35. Immediately or at any later time (depending on the details of the mechanism to be controlled or operated by the set parts 31 and 35) the parts 31 and 35 may be returned to their initial rest positions. In the illustrative example here disclosed, the parts 31 and 35 begin to return to their initial positions, under the influence of the spring 39, as soon as the driving arm 53 is unlatched from the member 31.

Obviously the driving mechanism may, within the spirit of the invention, be constructed in a reverse manner, so that the first part of the movement of the driving arm is idle and does not move the member 31, and then upon reaching the cam 73 or the like, the driving arm becomes latched to the member 31 and drives the member 31 through the remainder of the range of travel of the driving arm.

Preferably, but not necessarily, the disk 71 is provided with an extension or pointer 77 which swings over a graduated scale 79 visible to the user of the camera, so that by observing the position of the pointer on the scale, he will know the strength of light falling on the photocell 21, and thus will be able to adjust manually any other variable or adjustable parts of the camera which should be adjusted in accordance with light intensity, in addition to the part or parts which are automatically adjusted by the mechanism of the present invention.

Since the cam 73 serves merely to disconnect the driving arm 53 from the driven member 31, without actually stopping movement of the driving member, the driving member does not produce any great displacing force in a rotary direction on the cam 73 or the member 71, and thus does not tend with any great degree of force to rotate the moving coil 25. Consequently the moving coil and the member 71 and associated parts 73 and 77 can all be made relatively light, so as to be sensitive to small variations in light intensity, and they need not be particularly sturdy or rigid with consequent insensitivity. In most cases it is, however, desirable to provide a brake or other suitable means for holding the member 71 immovable while the cam 73 is coacting with the pin 75, to prevent any possibility of accidental displacement of the member 71 from its proper set position by the force of the pin 75.

Such a brake may be provided by constructing the periphery of the disk 71 in the form of a brake drum, to cooperate with brake shoe portions 81 and 82 formed respectively on brake levers 83 and 84, respectively pivoted at 85 and 86. These levers are provided, respectively, with operating arms 87 and 88, between which is placed an operating cam 89 which may conveniently be in the form of a double eccentric, the cam being mounted for rotation about its center and being fixed to an operating arm 91 pivoted to an operating link 93 slidably mounted in the guide 95. When the link 93 is moved to the right, the cam 89 is thereby turned so that it spreads the upper ends of the arms 88 and 87 apart, causing the levers 83 and 84 to move toward each other and thus bringing the brake shoe portions 81 and 82 to bear against the periphery of the disk 71, securely holding the disk immovable while the pin 75 comes into contact with and is operated by the cam 73 on the disk.

For operating the mechanism thus far described, there may conveniently be provided a plunger 101 accessible to the user of the camera, which plunger has a stem provided with a fixed part 103 against which a coiled spring 105 constantly bears, to tend to move the plunger 101 to its uppermost position. The plunger also has an inclined cam surface 107 cooperating with a lateral pin 109 on the brake operating link 93, and below this cam portion 107 is a slot 111 receiving a pin 113 extending laterally from a bell crank lever 115 which is pivoted to swing on the pivot 117. The lower end of the bell crank lever is pivoted at 119 to the driving link 63.

The cam 107 is so related to the length of the slot 111 that when the plunger 101 is depressed, the first part of the downward movement will draw the link 93 rightwardly before any motion of the bell crank 115 takes place. This rightward movement of the link 93 will turn the cam 89, spread the arms 87 and 88, and apply the brake to the disk 71, which disk has previously been positioned automatically in accordance with the light conditions, by the action of the photocell 21.

Then, after the brake is set, further downward motion of the plunger 101 will turn the bell crank 115 in a counterclockwise direction about its pivot 117, pulling rightwardly on the link 63, which will swing the driving arm 53 rightwardly or in a counterclockwise direction around its axis 27. Until the pin 75 on the driver arm strikes the cam 73, the driving tooth 59 on the driver arm will remain engaged in the notch 51 of the variable or adjustable member 31, so that this member 31 will turn with the driver arm, and will cause corresponding leftward movement of the rack bar 35. When the pin 75 of the driver arm rides up the cam 73, after the driver arm has moved through an extent of movement depending on the setting of the disk 71 in accordance with light conditions, then the tooth 59 will be withdrawn from the notch 51 and the driver arm may continue its full range of movement caused by full depression of the plunger 101, without causing any further movement of the parts 31 and 35, and without producing any great stress in or great tendency to rotate the disk 71. When the pressure on the plunger 101 is released, the spring 105 restores it to its normal or uppermost position, swinging the arm 53 clockwise to the left end of its range of travel, whereupon the tooth 59 may again engage in the notch 51 of the rotary member 31 which has meanwhile been restored to its initial undisplaced position by the spring 39.

It is seen that the parts 31 and 35, upon mere depression of the plunger 101, are set automatically to a variable position corresponding to the light intensity falling upon the photocell 21. As already stated, these parts 31 and 35 may be operatively connected to any part of the camera mechanism which it is desired to set in accordance with light intensity, such as the mechanism controlling the diaphragm opening, the mechanism controlling the duration of exposure, etc. In the construction here shown by way of example, the member 35 is connected to the shutter to operate the shutter and control the duration of exposure thereof, but this specific example is only by way of illustration and is not intended in a limiting sense.

In the illustrative example, the member 35 is provided near its left end with an inclined portion 131 which cooperates with a similarly inclined upper end of a lever 133 mounted to swing on a pivot 135. A spring 137 presses the lower arm of the lever 133 leftwardly, and this arm has a slot which receives a pin 141 on a slidable link 143 mounted to slide in a guide 145, the link being connected with the shutter blades 15 in known manner. By any suitable known construction, movement of the link 143 opens and closes the shutter blades, the opening movement beginning, for example, when the link 143 begins to move rightwardly, and the subsequent closing movement being completed when the link 143 returns to the left end of its movement. When the member 35 is moved leftwardly by the driving member 53, this causes leftward movement of the upper arm of the lever 133 and rightward movement of the lower arm against the pressure of the spring 137, moving the member 143 rightwardly and opening the shutter blades. Then when the driver is disengaged from the members 31 and 35, the member 35 moves rightwardly under the influence of its spring 39, at a speed determined by the timing or retarding means 43, which permits the lower arm of the lever 143 to move leftwardly under the influence of its spring 137, moving the link 143 leftwardly again and closing the shutter blades in known manner. The shutter blades will be open for a longer or shorter time depending on the extent to which the members 31 and 35 were moved by the driver 53 before the driver was disengaged therefrom, and thus the duration of the exposure will be dependent upon the strength of the light falling upon the photocell 21.

It is obvious, however, that the members 31 and 35 may be connected equally well to a member controlling the size of the diaphragm opening, or to any other suitable style or kind of shutter mechanism for controlling or determining the duration of exposure, and the adjustment of the parts 31 and 35 may, if desired, simply determine the length of exposure which is to be made by the shutter when the shutter is operated by other operating means, without actually operating the shutter as in the illustrative example here illustrated.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. A photographic camera having mechanism for taking pictures, said mechanism including variable means settable to a plurality of different positions corresponding to different conditions, disengageable driving means movable in one direction through a substantially constant range of travel at each operation, for moving said variable means from a position near one end of its range of movement toward the opposite end of said range, photocell means responsive to the light available for taking a picture, and a movable control element operatively connected to said photocell means to be set thereby in a position corresponding to the strength of said available light, said control element cooperating mechanically with said driving means to disengage said driving means from said variable means when said driving means reaches a position corresponding to the setting of said control element, so that said variable means will be moved by said driving means to a position corresponding to the strength of said available light and so that said driving means may then continue to move through its said range of travel independently of said variable means.

2. A photographic camera having mechanism for taking pictures, said mechanism including adjustable means settable to a plurality of different positions within a range of movement, to correspond to different strengths of light available for taking a picture, means for moving said adjustable means toward one end of said range of movement, driving means operatively engageable with and disengageable from said adjustable means, means for moving said driving means through a substantially constant range of travel at each operation, said driving means when being moved and when operatively engaged with said adjustable means being effective to move said adjustable means toward the opposite end of its range of movement, photocell means responsive to the light available for taking a picture, a movable control element operatively connected to said photocell means to be set automatically in a position corresponding to said available light, and cam means on said control element for mechanical cooperation with said driving means to disengage said driving means from said adjustable means when said adjustable means is moved by said driving means to a position corresponding to the light available for taking a picture, so that said driving means may complete its travel in one direction without causing further movement of said adjustable means.

3. A photographic camera having mechanism for taking pictures, said mechanism including adjustable means settable to a plurality of different positions within a range of movement, to correspond to different strengths of light available for taking a picture, means for moving said adjustable means toward one end of said range of movement, driving means operatively engageable with and disengageable from said adjustable means, means for moving said driving means through a range of travel which is substantially constant at each operation, said driving means when being moved and when operatively engaged with said adjustable means being effective to move said adjustable means toward the opposite end of its range of movement, photocell means responsive to the light available for taking a picture, a movable control element operatively connected to said photocell means to be set automatically in a position corresponding to said available light, cam means on said control element for cooperation with said driving means to disengage said driving means from said adjustable means when said adjustable means is moved by said driving means to a position corresponding to the light available for taking a picture, brake means for holding said control element against movement while said cam means thereon is cooperating with said driving means, and mechanism rendering said brake means effective during movement of said driving means.

4. A photographic camera as described in claim 3, further including a manually operable element effective, when moved, first to operate said brake means and then to operate said means for moving said driving means.

5. A photographic camera having mechanism for taking pictures, said mechanism including the combination of adjustable means settable to a plurality of different positions within a range of movement, to correspond to different strengths of light, driving means, means for moving said driving means through a range of movement, a releasable latch operatively connecting said adjustable means to said driving means to move therewith, spring means for holding said latch in operative position, a shiftable disengaging member for contacting with said latch to move said latch to unlatched position at a variable point in the range of movement of said driving means depending on the position of said disengaging member, and light-responsive photocell means for determining the position of said disengaging member.

6. A photographic camera having mechanism for taking pictures, said mechanism including the combination of adjustable means settable to a plurality of different positions within a range of movement, to correspond to different strengths of light, driving means operatively engageable with and disengageable from said adjustable means, means for moving said driving means through a range of movement of substantially constant length in one direction, means for holding said driving means operatively engaged with said adjustable means during part of its range of movement, disengaging means shiftable to different positions along the range of movement of said driving means and making mechanical contact with said driving means to disengage said driving means from said adjustable means at a variable point in the range of movement of said driving means determined by the position of said disengaging means, so that said driving means may continue to move in the same direction independently of said adjustable means, light-responsive photocell means for setting said disengaging means, a brake for holding said disengaging means in fixed position, and mechanism for operating said driving means and concomitantly rendering said brake effective to hold said disengaging means.

7. A photographic camera having mechanism for taking pictures, said mechanism including the combination of adjustable means settable to a plurality of different positions within a range of movement, to correspond to different strengths of light, driving means operatively engageable with and disengageable from said adjustable means, means for moving said driving means through a range of movement, means for holding said driving means operatively engaged with said adjustable means during part of its range of movement, disengaging means shiftable to different positions along the range of movement of said driving means and making mechanical contact with said driving means to disengage said driving means from said adjustable means at a variable point in the range of movement of said driving means determined by the position of said disengaging means, light-responsive photocell means for setting said disengaging means in different positions corresponding to different light conditions, and frictional brake means for holding said disengaging means immovably in its set position while said driving means is moving through at least part of said range of movement.

8. A photographic camera having mechanism for taking pictures, said mechanism including the combination of light-responsive photocell means, moving coil means mounted for rotation about an axis and electrically connected to said photocell means to be positioned in accordance with the light falling upon said photocell means, a rotary member mounted for rotation about an axis substantially coincident with that of said coil means, a driving arm mounted for rotation about an axis substantially coincident with that of said rotary member, means for turning said driving arm around its axis, latch means on said driving arm for engaging said rotary member to turn it with said driving arm, an exposure controlling member operatively coupled to said rotary member, and means on said coil means for operating said latch means at a variable point in the turning movement of said driving arm depending on the position of said coil means.

9. A photographic camera having mechanism for taking pictures, said mechanism including the combination of light-responsive photocell means, moving coil means mounted for rotation about an axis and electrically connected to said photocell means to be positioned in accordance with the light falling upon said photocell means, a rotary member mounted for rotation about an axis substantially coincident with that of said coil means, a driving arm mounted for rotation about an axis substantially coincident with that of said rotary member, means for turning said driving arm around its axis, latch means on said driving arm for engaging said rotary member to turn it with said driving arm, an exposure controlling member operatively coupled to said rotary member, means on said coil means for operating said latch means at a variable point in the turning movement of said driving arm depending on the position of said coil means, and holding means for holding said coil means against rotation during at least part of said turning movement of said driving arm.

10. A photographic camera of the type including a photocell responsive to the light available for taking a picture, and an exposure controlling member to be affected in accordance with the available light, characterized by the provision of driving mechanism movable through a range of travel, engageable and releasable coupling means for coupling said driving mechanism to said member during a part only of the movement of said driving mechanism, a coupling actuating member mounted for movement to any one of a multiplicity of different positions and controlled by said photocell to be set thereby in a position corresponding to the available light, and mechanism for braking said coupling actuating member to hold it immovably in the position to which it has been set by said photocell, when said driving mechanism is operated, to actuate said coupling means so that operation of said driving mechanism will affect said exposure controlling member in accordance with the available light.

WALTER SCHMIDT.